(12) United States Patent  (10) Patent No.: US 8,747,729 B2
Inoguchi  (45) Date of Patent: Jun. 10, 2014

(54) PRODUCT METHOD FOR CERAMIC STRUCTURE AND PRODUCTION METHOD FOR CERAMIC HONEYCOMB STRUCTURE

(75) Inventor: Kazuhiro Inoguchi, Toyota (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/654,495

(22) Filed: Dec. 22, 2009

(65) Prior Publication Data

US 2010/0102491 A1    Apr. 29, 2010

Related U.S. Application Data

(63) Continuation of application No. 10/267,049, filed on Oct. 9, 2002, now abandoned.

(30) Foreign Application Priority Data

Oct. 10, 2001 (JP) ................. 2001-312797
Sep. 10, 2002 (JP) ................. 2002-264263

(51) Int. Cl.
    *C04B 38/00* (2006.01)
(52) U.S. Cl.
    CPC ................. *C04B 38/0006* (2013.01)
    USPC ...................... 264/630; 264/631
(58) Field of Classification Search
    USPC ...................... 264/630
    See application file for complete search history.

(56) References Cited

U.S. PATENT DOCUMENTS

| 2,694,245 | A | 11/1954 | Rogers et al. |
| 4,364,881 | A | 12/1982 | Mizuno et al. |
| 5,432,224 | A | 7/1995 | Ryuhgoh et al. |
| 5,578,147 | A | 11/1996 | Nayar et al. |
| 5,935,514 | A | 8/1999 | Ford et al. |
| 6,080,345 | A | 6/2000 | Chalasani et al. |
| 6,200,517 | B1 * | 3/2001 | Peng et al. ............ 264/630 |
| 6,939,825 | B1 | 9/2005 | Ohno et al. |
| 2003/0146530 | A1 | 8/2003 | Vaghefi et al. |

FOREIGN PATENT DOCUMENTS

| CN | 1263517 A | 8/2000 |
| DE | 42 26 276 A1 | 2/1994 |
| JP | 6-329465 | 11/1994 |
| JP | 7069711 | 3/1995 |

* cited by examiner

*Primary Examiner* — Joseph S Del Sole
*Assistant Examiner* — Russell Kemmerle, III
(74) *Attorney, Agent, or Firm* — Nixon & Vanderhye P.C.

(57) ABSTRACT

This invention provides a production method for a ceramic structure capable of making a extrusion rate coefficient, in extruding of a ceramic structure, greater than that of prior art technologies. In a production method for a ceramic structure by the steps of mixing and kneading a ceramic batch material containing at least ceramic powder and water, extruding the mixture so kneaded, and drying and sintering a resulting extrudate, a water-insoluble liquid lubricant consisting of acyl glycerin and/or a derivative is added to the ceramic batch material.

12 Claims, 12 Drawing Sheets

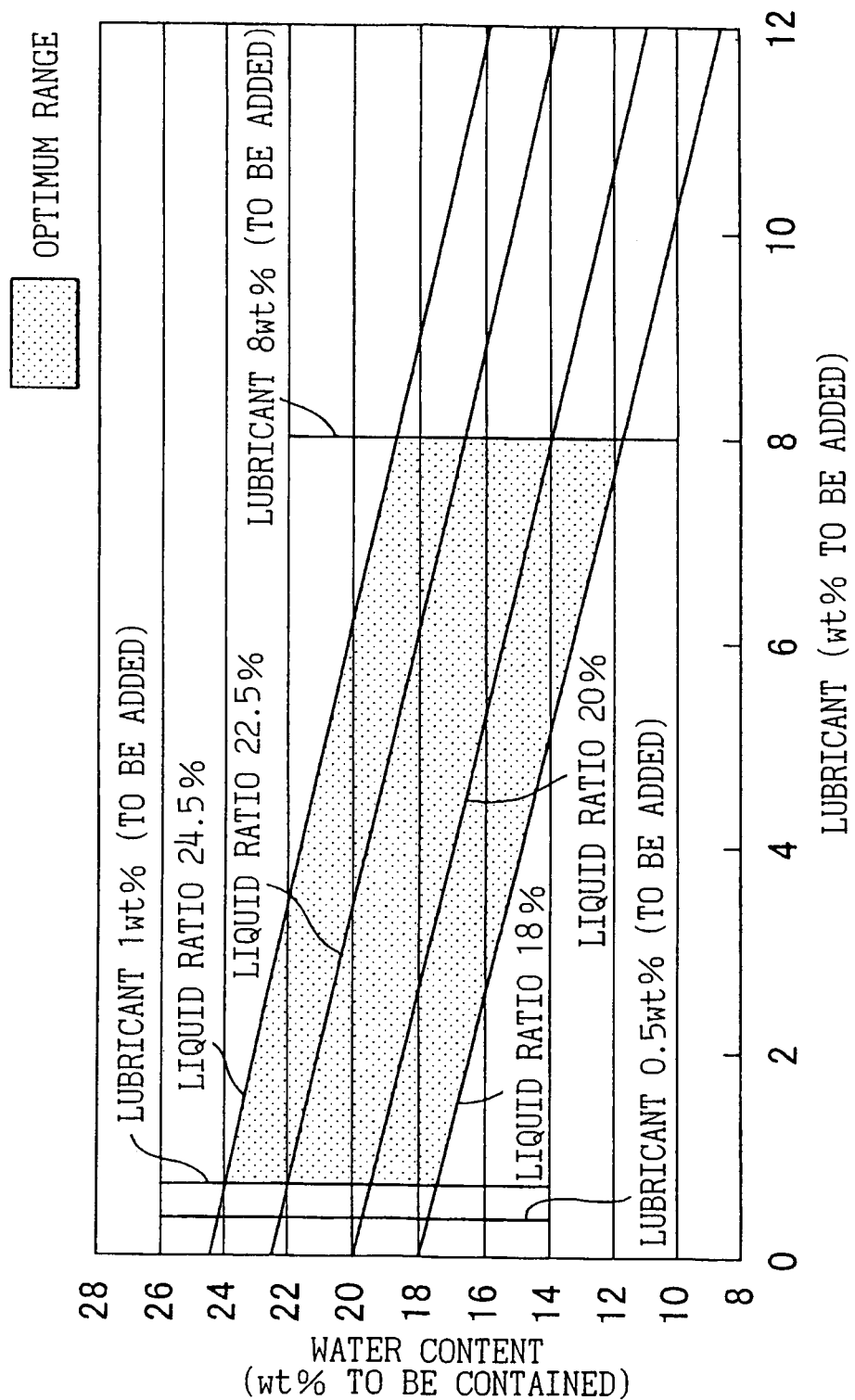

PRODUCT METHOD FOR CERAMIC STRUCTURE AND PRODUCTION METHOD FOR CERAMIC HONEYCOMB STRUCTURE

This application is a continuation of application Ser. No. 10/267,049 filed Oct. 9, 2002 now abandoned which in turn claims priority of Japanese application Ser. No. 2001-312797 filed Oct. 10, 2001 and Japanese application Ser. No. 2002-264263 filed Sep. 10, 2002, the contents of each of which are incorporated herein by reference.

BACKGROUND OF THE INVENTION

1. Field of the Invention

This invention relates to a production method for a ceramic structure or a ceramic honeycomb structure. The method includes extrusion a ceramic material by use of a dedicated die. The invention particularly relates to an improvement of a extrusion rate during extrusion.

2. Description of the Related Art

A honeycomb structure assembled into an exhaust gas purification apparatus of an automobile, for example, is one of the structures produced from ceramics such as cordierite (refer, for example, to Japanese Unexamined Patent Publication (Kokai) No. 8-11528). This honeycomb structure includes a cylindrical outer cladding, partitions arranged in grid form inside the outer cladding and a large number of cells separated by partitions and penetrating in an axial direction.

To produce this ceramic honeycomb structure, a ceramic material containing ceramic powder, water, a binder and a lubricant is mixed and kneaded, extruded, and then dried and sintered.

In the honeycomb structure described above, it has been required to reduce the thickness of the partitions and the cell width in order to improve the performance of the exhaust gas purification apparatus. To satisfy this required, the slit width for forming the partitions must be reduced in the die used for extrusion.

However, the reduction of the slit width of the die for extrusion affects an extrusion step and eventually, productivity of an overall production process. In other words, when extrusion is conducted by use of an extruder using a die that has a reduced slit width, an extrusion pressure at the same extrusion rate is higher than when the slit width is great. Therefore, so long as the extruder having the same pressurization performance as that of existing extruders is employed, the extrusion rate unavoidably drops. The drop of this extrusion rate governs the overall production process of the honeycomb structure, and productivity drops.

The extrusion rate can be improved to a certain extent when a bigger extruder is used to increase the pressure. In this case, however, the temperature of the resulting molding rises and the shape of the extrusion cannot be retained. Therefore, a cooler for cooling the extruder must be added or the capacity of the cooler must be increased. As a result, the setup cost increases.

When the pressurization force is excessively increased, the die used for extrusion is broken, or extrusion defect occurs due to deflection of the die. Therefore, an increase in the pressurization force is limited.

For these reasons, development of a technology that can acquire a higher extrusion rate at a lower extrusion pressure than ever has been desired to extrude a honeycomb structure as the ceramic structure described above. In other words, when a extrusion pressure and a extrusion rate are plotted on the abscissa and the ordinate, respectively, and their relation is expressed by a graph, and when the gradient (rate/pressure) is defined as "extrusion rate efficiency", development of a technology capable of increasing this extrusion rate coefficient has been desired.

If such a technology was available, the technology could be applied to the production of ceramic structures, having a sheet form and various other forms, besides the honeycomb structure described above.

SUMMARY OF THE INVENTION

In view of the problems with the prior art technologies described above, the invention aims at providing a production method for a ceramic structure capable of increasing the extrusion rate coefficient described above in the extrusion of ceramic structures.

A first aspect of the invention provides a production method for a ceramic structure comprising the steps of mixing and kneading a ceramic material containing at least a ceramic powder and water, extruding the mixture so kneaded, and drying and sintering a extrudate, wherein a water-insoluble liquid lubricant (hereinafter merely called a "lubricant" in some cases) consisting of acyl glycerin as its main component and/or its derivative is added to the ceramic batch material.

To extrusion-die a ceramic structure, it is necessary to impart plasticity to a ceramic batch material as its starting material. Therefore, water has ordinarily been added in the past to the ceramic batch material, and a water-soluble additive such as a lubricant having high compatibility with water is further added.

In the invention, a water-insoluble liquid lubricant consisting of acyl glycerin, and/or a derivative, as a main component is added to the ceramic batch material. This is revolutionary in view of the fact that a water-soluble lubricant has been used in the past for the ceramic batch material that is kneaded to a clay form by use of water, and the invention employs an entirely novel ceramic batch material. In this way, the invention can make the resistance in extrusion of the ceramic batch material smaller and the extrusion rate coefficient greater than when the water-soluble lubricant is added as in the prior art technologies.

The reason is assumed as follows. The water-insoluble liquid lubricant, that is incompatible with water but is uniformly dispersed in the ceramic batch material kneaded into the clay form, leaches to the clay surface when a pressure is applied during extrusion, wets the friction surfaces of a cylinder and barrel of an extruder and the die, and reduces the coefficient of friction.

This phenomenon is analogous to squeezing of a material of vegetable oil such as soybean oil and rapeseed oil. The greater the pressure applied, the greater becomes the amount of the lubricant leached from inside the clay. Therefore, even when the precessure locally increases, a necessary amount of the lubricant leaches concentratedly to that portion and reduces the coefficient of friction.

In contrast, water-soluble lubricants according to the prior art have high affinity with water and are bonded to the ceramic power material together with water. Therefore, even when the pressure is applied during extrusion, the lubricants do not leach to the clay surface. Therefore, only the limited amount of the water-soluble lubricants existing on the clay surface can contribute to lubrication performance. Even when a high pressure is locally applied, these lubricants cannot be concentrated on that portion, and cannot reduce the coefficient of friction, either.

The lubricant consisting of acyl glycerin and/or its derivative among the water-insoluble liquid lubricants can secure a relatively large gap between the ceramic raw material and the friction surface of the die, though the reason has not entirely been clarified. It is assumed that the greater the adsorption force of the lubricant to the die, the smaller becomes the coefficient of friction.

The invention can make the extrusion rate coefficient, described above, in extrusion of the ceramic structure greater than in the prior art technologies. Therefore, the invention can suppress a drop in the rate when a ceramic structure having a shape that involves a large die resistance during extrusion is extruded. In consequence, the invention can improve productivity while keeping the quality of the ceramic structure and its shape retainability.

A second aspect of the invention provides a production method of a ceramic honeycomb structure having partitions arranged in a honeycomb shape, comprising the steps of mixing and kneading a ceramic batch material containing at least ceramic powder, water, a binder, extruding the mixture so kneaded, and drying and sintering a extrudate, wherein a water-insoluble liquid lubricant that is a water-insoluble liquid at a temperature of extrusion is added to the ceramic batch material.

When a ceramic honeycomb structure is extrusion, water-containing minerals such as talc, kaolin, and so forth, are used as the main material of the ceramic batch material. Therefore, large quantities of water having high compatibility with them have been used in the past. Therefore, it has been believed that additives such as a lubricant must be water-soluble.

In the second invention, the water-insoluble liquid lubricant that is a water-insoluble liquid at a temperature of extrusion is added to the ceramic batch material. This is extremely revolutionary in the production of the ceramic honeycomb structure because the water-soluble lubricant has been employed in the past. In other words, the invention uses a ceramic batch material having an entirely novel construction. In comparison with the case where the water-soluble lubricant is added as in the prior art technologies, the resistance when extruding the ceramic honeycomb structure by extruding the ceramic batch material can be reduced, and the extrusion rate coefficient can be increased.

Because the second invention can make the extrusion rate coefficient greater in extrusion of the ceramic honeycomb structure greater than in the prior art technologies, the drop of the extrusion rate can be suppressed when a ceramic honeycomb structure, having a shape that has a large die resistance in extruding, is extruded. The second invention can further suppress die cracking resulting from the increase of the pressure and extrusion defect resulting from die deflection. For these reasons, the second invention can improve productivity while keeping the quality of the ceramic honeycomb structure and its shape retainability.

BRIEF DESCRIPTION OF THE DRAWINGS

FIG. 13 is an explanatory view showing an optimum range of lubricant content and water content (moisture ratio) in a matrix in Example 7.

DESCRIPTION OF THE PREFERRED EMBODIMENTS

Figure 1:
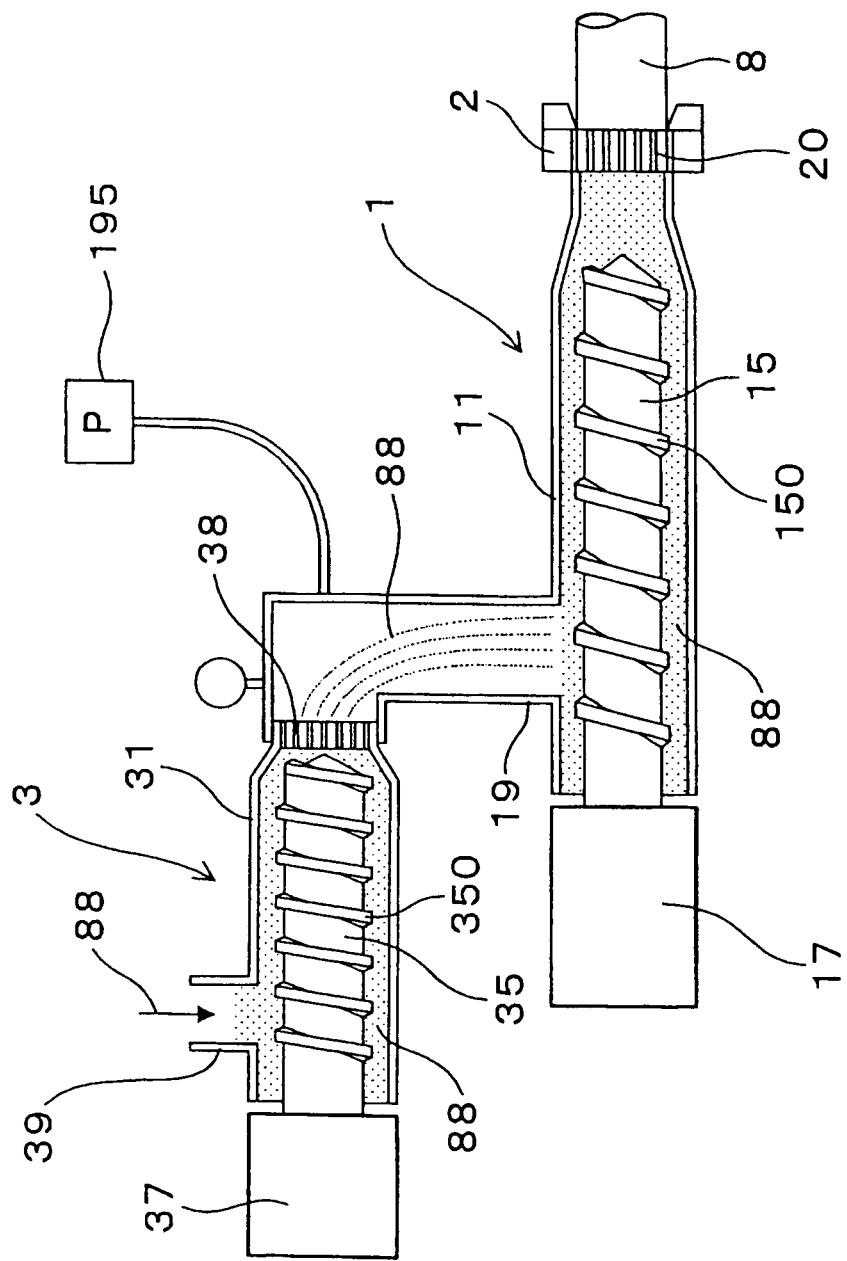
FIG. 1 is an explanatory view showing a construction of an extruder in Example 1.
Figure 2:
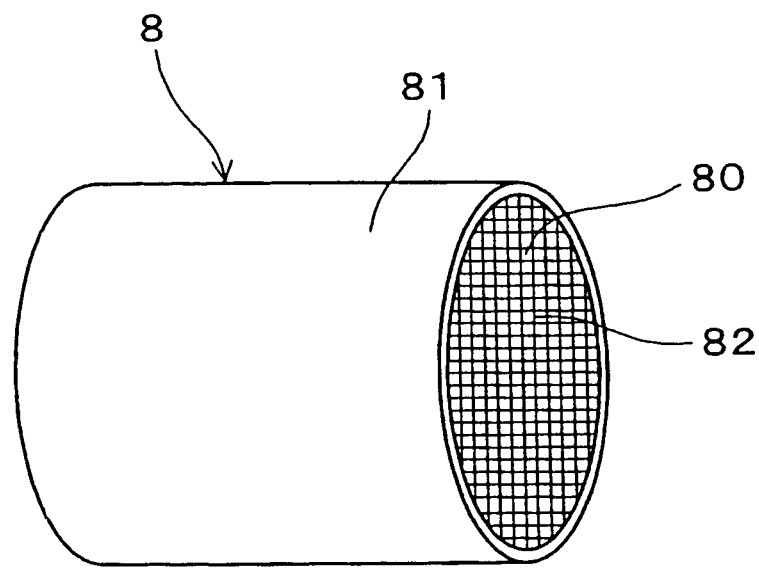
FIG. 2 is an explanatory view showing a construction of a honeycomb structure in Example 1.

The first invention described above can use a water-insoluble liquid lubricant consisting of acyl glycerin, and/or a derivative, as a main component. The term "liquid lubricant" herein used excludes those grease-like liquid lubricants that have an extremely high viscosity at normal temperature.

The water-insoluble liquid lubricant consisting of acyl glycerin, and/or a derivative, as the main component preferably has a viscosity of 15 to 45 cp at 50° C. In this case, handling of the water-insoluble liquid lubricant becomes easier when an automatic line is set up. When the viscosity is less than 15 cp, the viscosity is so low that a sufficient effect cannot be acquired in extrusion at a high pressure. When the viscosity exceeds 45 cp, on the other hand, the viscosity is so high that an extrusion rate cannot be improved.

To measure the viscosity (cp) described above, rotary viscometers known generally such as a B type, a C type, a BH type, an E type, and so forth, can be employed for the measurement.

Acyl glycerin is called "acyl glycerol" according to the IUPAC nomenclature, and includes monoacyl glycerin, diacyl glycerin and triacyl glycerin. Triacyl glycerin among them is a main component of natural fat. It is expressed by a chemical formula in which three aliphatic acids are bonded with one glycerin:

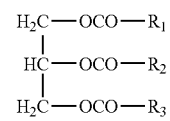

(where each of $R_1$, $R_2$ and $R_3$ is an alkyl group of an aliphatic acid).

The aliphatic acids $R_1$, $R_2$ and $R_3$ in the chemical formula given above include various kinds. Examples of the water-insoluble liquid lubricant consisting of triacyl glycerin, and/ or a derivative, as its main component are various vegetable oil such as rapeseed oil, soybean oil, sunflower oil, cotton seed oil, and so forth.

Preferably, 2.0 to 8.0 wt % (to be added) of methyl cellulose on the basis of 100 wt % of ceramic powder is added to the ceramic batch material. Methyl cellulose increases plasticity, improves shape retainability when extrusion is conducted, and improves dry strength of a dried ceramic structure. When the addition amount of methyl cellulose is less than 2.0 wt % (to be added), an improvement effect of plasticity and bonding power during drying due to its addition cannot be expected. When the addition amount of methyl cellulose exceeds 8.0 wt % (to be added), on the other hand, a problem occurs that volume shrinkage becomes excessively great after sintering.

In the invention, when the amount of ceramic powder is 100 wt % as the unit of the addition amount, the amount of the component to be added to ceramic powder is expressed as wt % (to be added) and when the overall ceramic bath is expressed as 100 wt %, the component contained in the batch material is expressed by wt % (to be contained).

The water-insoluble liquid lubricant consists of triacyl glycerin as the main component. The addition amount of the water-insoluble liquid lubricant is preferably at least 0.5 wt % (to be added) on the basis of 100 wt % of ceramic powder. When the water-insoluble liquid lubricant consisting of triacyl glycerin as the main component is used, the effect of improving the extrusion rate coefficient brought forth by the addition of the water-insoluble liquid lubricant is small if the addition amount of the water-insoluble liquid lubricant is less than 0.5 wt % (to be added). There is no upper limit to the addition amount of the water-insoluble liquid lubricant from the aspect of the improvement of the extrusion rate coefficient, the addition amount is preferably limited from the aspects of saturation of the addition effect and the increase of the cost.

The main component of the aliphatic acid constituting triacyl glycerin described above is preferably an aliphatic acid having 18 carbon atoms. Concrete examples are stearic acid, oleic acid, linolic acid, linolenic acid, elaidic acid, cis-vaccenic acid, vaccenic acid and other aliphatic acids. Triacyl glycerin constituted by these C18 aliphatic acids is liquid at normal temperature, has a suitable viscosity and is most suitable as the water-insoluble liquid lubricant.

A saponification value of triacyl glycerin is preferably not greater than 200. In this case, the effect of improving the extrusion rate coefficient can be sufficiently acquired.

Next, in the production method of the ceramic honeycomb structure according to the second invention, the water-insoluble liquid lubricant that is a water-insoluble liquid at the temperature of extrusion is added to the ceramic batch material.

In the case of the ceramic honeycomb structure, a binder such as methyl cellulose is generally added to the batch material to impart plasticity and to obtain dry strength. When the temperature is too high, in this case, the resulting extrusion becomes so soft that shape retainability cannot be secured. Therefore, extrusion is carried out while the temperature of the material (at the time of extrusion) is controlled to about 10 to about 30° C. with a center temperature at about 20° C.

Therefore, the water-insoluble liquid lubricant suitable for this purpose preferably has a kinematic viscosity of 30 cSt to 120 cSt at 20° C.

Therefore, a sufficient effect can be obtained when the ceramic honeycomb structure is extruded while the material temperature is controlled to 10 to 30° C., too.

Incidentally, the kinematic viscosity described above may belong to the following four viscosity grades stipulated in ISO viscosity classification for industrial lubricant oil (ISO 3448-1975 and JIS K2001 "Viscosity Classification of Industrial Lubricant Oil" applied correspondingly to the former), that is, ISO VG22, ISO VG32, ISO VG46 and ISO VG68.

The sum of water and the water-insoluble liquid lubricant contained in the ceramic batch material is preferably 18.0 to 24.5 wt % (to be contained) on the basis of 100 wt % of the total ceramic batch material.

When the sum of water and the water-insoluble liquid lubricant contained in the ceramic batch material exceeds 24.5 wt % (to be contained), the raw material becomes so soft that the ceramic honeycomb structure undergoes deformation due to its own weight and cannot retain the shape after extruding even when the material temperature is regulated.

When the sum of water and the water-insoluble liquid lubricant contained in the ceramic batch material is smaller than 18.0 wt % (to be contained), the viscosity of the material becomes so high that the extrusion pressure exceeds the die strength, or the ceramic batch material becomes powdery and dusty with the result that plasticization cannot be attained (the material does not become clay-like) and extruding becomes substantially impossible.

When the thickness of partitions of the ceramic honeycomb structure is smaller than 150 μm, that is, when extrusion is carried out by use of a die having a slit width of smaller than 150 μm, the sum of water and the water-insoluble liquid lubricant is preferably 20.0 to 22.5 wt % (to be contained) on the basis of 100 wt % of the overall ceramic batch material as will be later described. Shape retainability is of importance in a thin ceramic honeycomb structure, and to retain the shape, the sum of the contents is more preferably not greater than 22.5 wt % (to be contained). Since the extrusion pressure becomes greater in the thin ceramic honeycomb structure, the sum of the content is more preferably at least 20.0 wt % (to be contained) to obtain an excellent extrusion condition.

In the second invention, the binder described above is methyl cellulose, and the content of the binder is preferably 2.0 to 8.0 wt % (to be added) when the content of ceramic powder is 100 wt %. The reason for limitation of the methyl cellulose content in this case is the same as that of the first invention.

The ceramic honeycomb structure described above has partitions arranged in the honeycomb shape. Therefore, it has large resistance particularly when passing through the die, and the extrusion rate coefficient is likely to become small. In this sense, the application of the invention is extremely effective.

The thickness of the partitions is preferably not greater than 150 μm. In this case, because the resistance becomes great when the ceramic honeycomb structure passes through the die, and the application of the invention is further effective.

The honeycomb structure is preferably extrusion-molded by use of a die having slits for forming the partitions described above, and a width of the slit is preferably not greater than 150 μm. When the slit width of the die for extruding the honeycomb structure is not greater than 150 μm in the honeycomb structure, the extrusion rate coefficient drops particularly at the time of extrusion. Therefore, when the slit width is not greater than 150 μm in the honeycomb structure, too, the application of the invention is further effective.

In the second invention, too, the water-insoluble liquid lubricant is triacyl glycerin and when the amount of ceramic powder is 100 wt %, the addition amount of the water insoluble liquid lubricant is preferably 1.0 to 8.0 wt % (to be added).

When the addition amount of the water-insoluble liquid lubricant exceeds 8.0 wt % (to be added) in the case of a ceramic honeycomb structure having a complicated shape, large amounts of oil are burnt and scattered during a degreasing process at the time of sintering, and sintering cracks are likely to occur. When the amount is less than 1.0 wt % (to be added), the remarkable effect of improving the extrusion rate cannot be obtained in comparison with the existing level. Therefore, the addition amount of the water-insoluble liquid lubricant is preferably 1.0 to 8.0 wt % (to be added).

In the second invention, too, the main component of the aliphatic acid constituting triacyl glycerin described above is preferably an aliphatic acid having 18 carbon atoms in the same way as in the first invention.

In the second invention, too, the saponification value of triacyl glycerin is preferably not greater than 200 in the same way as in the first invention.

EXAMPLE 1

A production method of a ceramic structure according to this example will be explained with reference to FIGS. 1 to 4.

In a method of producing a ceramic structure 8 by the steps of mixing and kneading a ceramic batch material 88 containing at least ceramic powder and water, extruding the mixture, and drying and sintering the resulting extrudate, this example added a water-insoluble liquid lubricant consisting of acyl glycerin and/or its derivative as a main component to the ceramic batch material 88.

Hereinafter, an explanation will be given in detail.

This example produced a honeycomb structure including an outer cladding 81, partitions 82 arranged in a grid form inside the outer cladding 81 and a large number of cells 80 separated by the partitions 82 and penetrating in an axial direction, and consisting of cordierite as the main component.

First, talc, kaolin, alumina and aluminum hydroxide powder that were components capable of changing to cordierite after sintering were used as ceramic powder that constituted the ceramic batch material 88 described above. A water-insoluble liquid lubricant consisting of methyl cellulose, water and acyl glycerin and/or its derivative as the main component was added to the powder mixture to form the ceramic batch material 88.

Rapeseed oil consisting of triacyl glycerin as the main component, more concretely rapeseed oil containing 97% of triacyl glycerin, 0.8% of diacyl glycerin and 0.1% of monoacyl glycerin by weight ratio, was used as the water-insoluble liquid lubricant consisting of acyl glycerin and/or its derivative as the main component.

The aliphatic acid composition (mol %) consists of $C_{16:0}$=4.0%, $C_{18:0}$=1.8%, $C_{18:1}$=57.8%, $C_{18:2}$=21.8%, $C_{18:3}$=11.2%, $C_{20:1}$=1.9% and $C_{22:1}$=1.0%. Here, symbol C represents carbon, symbol a in a:b as the suffix to C represents the number of carbon atoms and b represents the number of double bonds.

Next, the ceramic batch material 88 was kneaded in a kneader 3 and was extruded by use of a screw type extruder 1 as shown in FIG. 1. Each of the extruder 1 and the kneader 3 included inside a cylindrical frame 11, 31 a screw 15, 35 having a screw plate 150, 350 that was helically wound. The crew 15, 35 was driven for rotation by a motor 17, 37 connected to its rear end.

A material charging hole 39 was provided to the upper part of the frame 31 of the kneader, and the ceramic batch material 88 was charged through this charging hole 39. The kneaded ceramic batch material 88 was extruded from a distal end portion 38 of the kneader 31 and was then charged into a material charging hole 19 of the extruder 1. The material charging portion to the extruder 1 was kept as a whole under vacuum by a vacuum pump 195 to suppress entrapment of the ceramic batch material into air.

A die 2 for shaping was arranged at the distal end of the extruder 1. The die 2 had grid-like slits 20 corresponding to the shape of the partitions 82 of the honeycomb structure 8 to be produced.

To conduct extrusion, after being kneaded by the kneader 3, the ceramic batch material 88 was charged into the extruder 1, was moved forth by the revolution of the screw 15 and was thereafter extruded from the die 2. In this way, the honeycomb structure 8 was extruded and extruded.

The honeycomb structure 8 so extruded was serially cut into a desired length and was passed through subsequent drying and sintering steps to give complete products.

In this embodiment, rapeseed oil as the water-insoluble liquid lubricant consisting of triacyl glycerin as described above was added to the ceramic batch material 88. Therefore, in comparison with the case where a conventional lubricant was added, the extrusion rate coefficient in extrusion could be drastically improved and presumably for the following reason.

The water-insoluble liquid lubricant such as triacyl glycerin was not dissolved in water but was dispersed in the ceramic batch material. Therefore, when the pressure was applied during extrusion, the lubricant leached to the clay surface, lubricated the cylinder, the barrel and the friction surface of the die and could thus decrease the coefficient of friction. The greater the pressure applied in this case, the greater became the amount of the lubricant leaching from inside the clay. Consequently, even when the pressure locally increased, a necessary amount of lubricant was concentratedly supplied to that portion, and the coefficient of friction could be efficiently lowered.

In contrast, a water-soluble lubricant was highly hydrophilic and was strongly bonded to the ceramic material as an aqueous solution. Therefore, even when the pressure was applied during extrusion, the lubricant did not leach to the clay surface.

In consequence, only a very small amount of the water-soluble lubricant existing on the clay surface contributed to lubrication performance. Even when a high pressure was locally applied, the lubricant did not concentrate on that portion and the frictional force reducing effect could not presumably operate sufficiently.

Synthetic lubricants well known in the past includes polyoxyethylene.polyoxypropylene.monobuthylether (trade name: "Uniloob") expressed by the following formula:

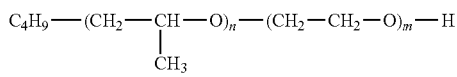

Figure 3:
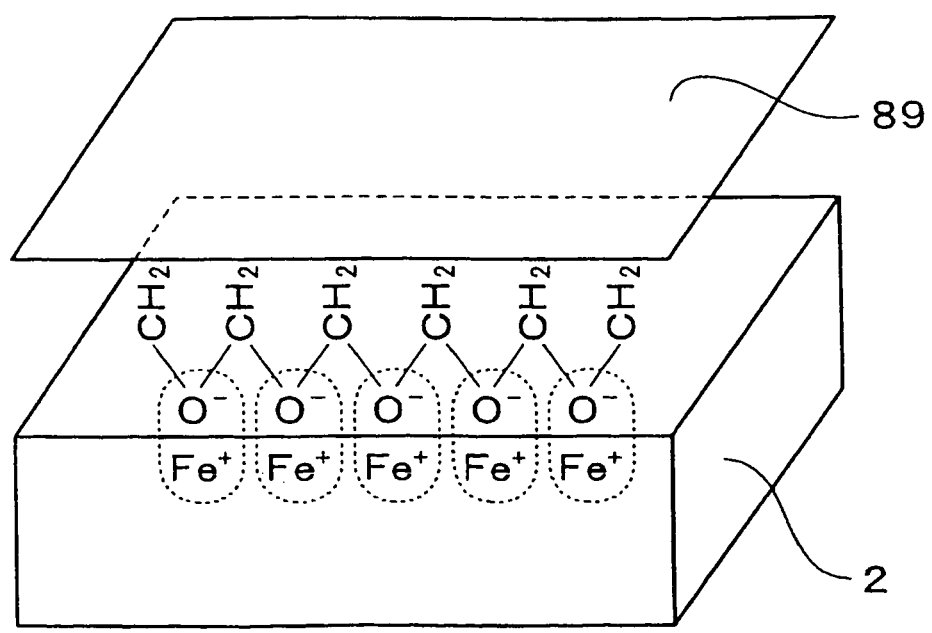
FIG. 3 is an explanatory view showing a clearance between a ceramic batch material and a friction surface of a die when using polyoxyethylene polyoxypropylene monobutylether (PPBE) as an example of existing lubricants.

This synthetic lubricant became water-soluble and water-insoluble depending on a polymerization ratio of propylene oxide and ethylene oxide. Since this lubricant was used in combination with water in the field of ceramics, it was generally used while the ratio of ethylene to oxide was set to 40% or more. In this case, the oxygen ion ($O^-$) of ethylene oxide was adsorbed to the iron ion ($Fe^+$) of the die 2, for example, between the die 2 and the boundary 89 surface of the solid content of the ceramic batch material as shown in FIG. 3.

Therefore, though PPBE described above had a relatively large molecular weight and an elongated molecule, the elongated molecule did not remain upright and a sufficient distance could not be secured between the die 2 and the boundary surface 89. As the adsorption force of the oxygen ion ($O^-$) was relatively small, the water-soluble lubricant was likely to peel from the die 2.

Figure 4:
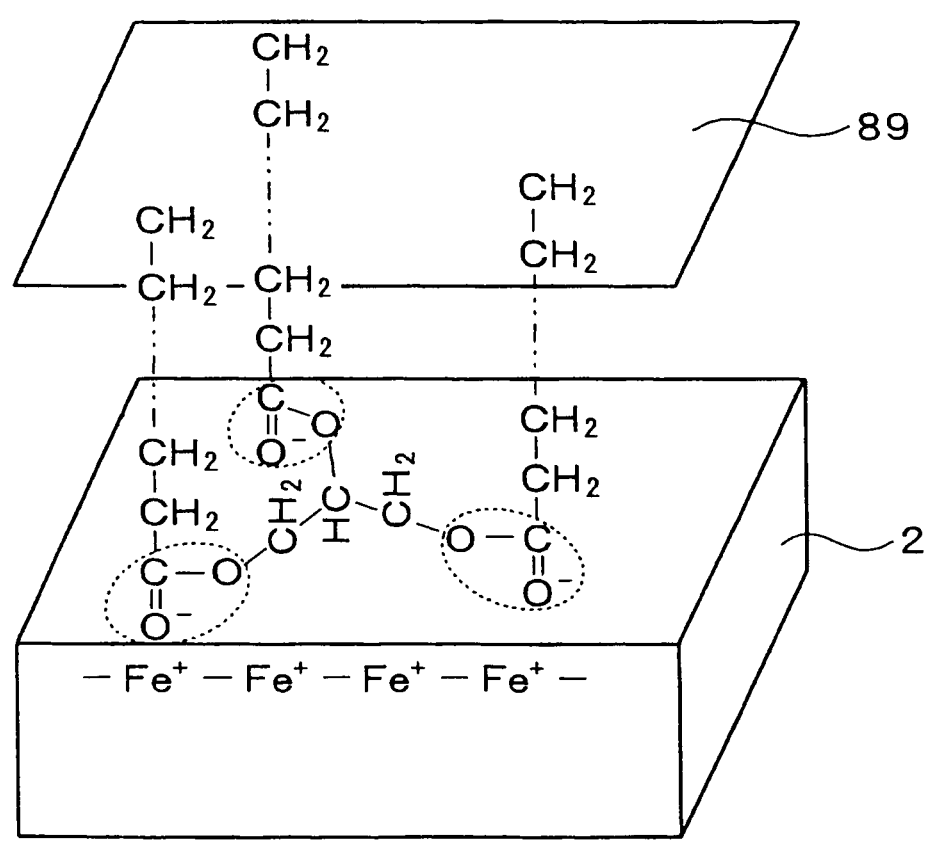
FIG. 4 is an explanatory view showing a clearance between the ceramic batch material and the friction surface of a die when rapeseed oil (Canola oil) (triacyl glycerin) is used in Example 1.

On the other hand, the water-insoluble liquid lubricant consisting of triacyl glycerin as the main component in this example could be arranged between the die 2 and the boundary surface 89 of the solid content of the ceramic batch material while the molecule of the aliphatic acid remained upright as shown in FIG. 4. Further, the acyl glycerin had a carbonyl group ($COO^-$) and exhibited a stronger adsorption force to the iron ion ($Fe^+$) than to the oxygen ion ($O^-$). Therefore, the water-insoluble liquid lubricant (rapeseed oil) consisting of triacyl glycerin as the main component of this example was more difficult to peel from the die 2 than the conventional water-soluble lubricant.

Presumably because the water-insoluble liquid lubricant consisting of triacyl glycerin as the main component was used as in this example, lubrication performance could be improved and the extrusion rate coefficient could be increased.

EXAMPLE 2

To further clarify the effect of Example 1, this example conducted experiments by comparing the case where PPBE (C1) was used as the conventional water-soluble lubricant with the cases where water-insoluble liquid lubricants consisting of four kinds of acyl glycerin as the main components were used.

Rapeseed oil (E1), soybean oil (E2), safflower oil (E3) and linseed oil (E4) consisting of triacyl glycerin as the main component were used as the water-insoluble liquid lubricants consisting of acyl glycerin as the main component.

A batch type kneader was used as a kneader, a screw type extruder for an experimental use was used as a extruding machine, and a die having a slit width of 150 μm and 400 mesh (400 cells/in.$^2$) was used as a die. Honeycomb structures having an outer diameter of Φ500 mm were extruded.

To prepare a ceramic batch material, 5 wt % (to be added) of methyl cellulose, 25.9 wt % (to be added) of water and 2.7 wt % (to be added) of various lubricants on the basis of 100 wt % of ceramic powder were added to a ceramic powder.

The extrusion rate relative to the extrusion pressure in extrusion by the screw extruder described above was measured.

Figure 5:
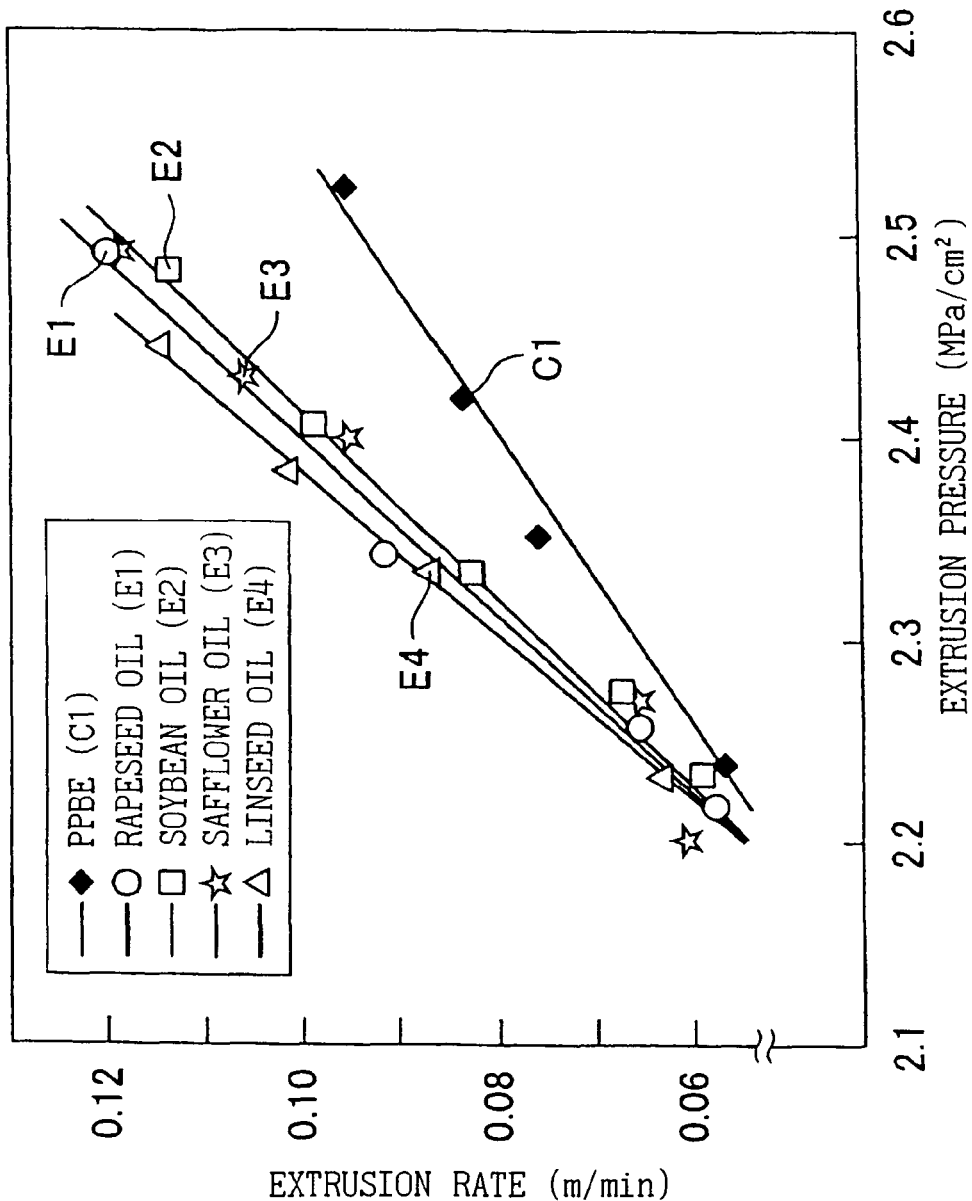
FIG. 5 is an explanatory view showing a relation between a extrusion pressure and a extrusion rate in Example 2.

FIG. 5 shows the measurement result. In the diagram, the abscissa represents the extrusion pressure (MPa/cm$^2$) and the ordinate does the extrusion rate (m/min). Symbols C1 and E1 to E4 respectively represent the results when the lubricants (C and E1 to E4) were used.

As can be understood from the diagram, the extrusion rates at the same extrusion pressure could be much more improved when the water-insoluble liquid lubricants (E1 to E4) consisting of triacyl glycerin as the main component were used than when the conventional water-soluble lubricant (C1) was used. In other words, the extrusion rate coefficient could be improved.

It could be understood from this result that the extrusion rate coefficient could be drastically increased in extrusion of the honeycomb structure when the lubricant-consisting of triacyl glycerin was used as the water-insoluble liquid lubricant.

EXAMPLE 3

This example used rapeseed oil as a typical example of the water-insoluble liquid lubricant consisting of acyl glycerin as the main component, and a test was carried out to determine an optimum range of its addition amount.

The test condition was as follows.

First, a ceramic powder that had the same composition as in Example 1, and methyl cellulose, water and rapeseed oil were added to 3 kg in total of ceramic powder. The addition amount of methyl cellulose was fixed at 5 wt % (to be added) on the basis of 100 wt % of ceramic powder, and the addition amount of water was fixed at 26 wt % (to be added) on the basis of 100 wt % of ceramic powder. The addition amount of rapeseed oil was changed within a range of 0.5 to 10.0 wt % (to be added) on the basis of 100 wt % of ceramic powder. For comparison, a case where rapeseed oil was not added at all was also tested.

A batch type kneader was used as a kneader for kneading the ceramic batch material, and an FM-30 vacuum extruder, a product of Miyazaki Steel Co., was used as a extruding machine. A die having a slit width of 150 μm and the number of cells of 400 cells/in.$^2$ was used.

Ceramic batch materials having mutually different addition amounts of rapeseed oil were used and each extrusion rate with respect to a extrusion pressure was measured to determine the extrusion rate coefficient for each addition amount of rapeseed oil. The extrusion rate coefficient when rapeseed oil was not added was set to 1, and a ratio to this value was determined as a extrusion rate ratio.

Figure 6:
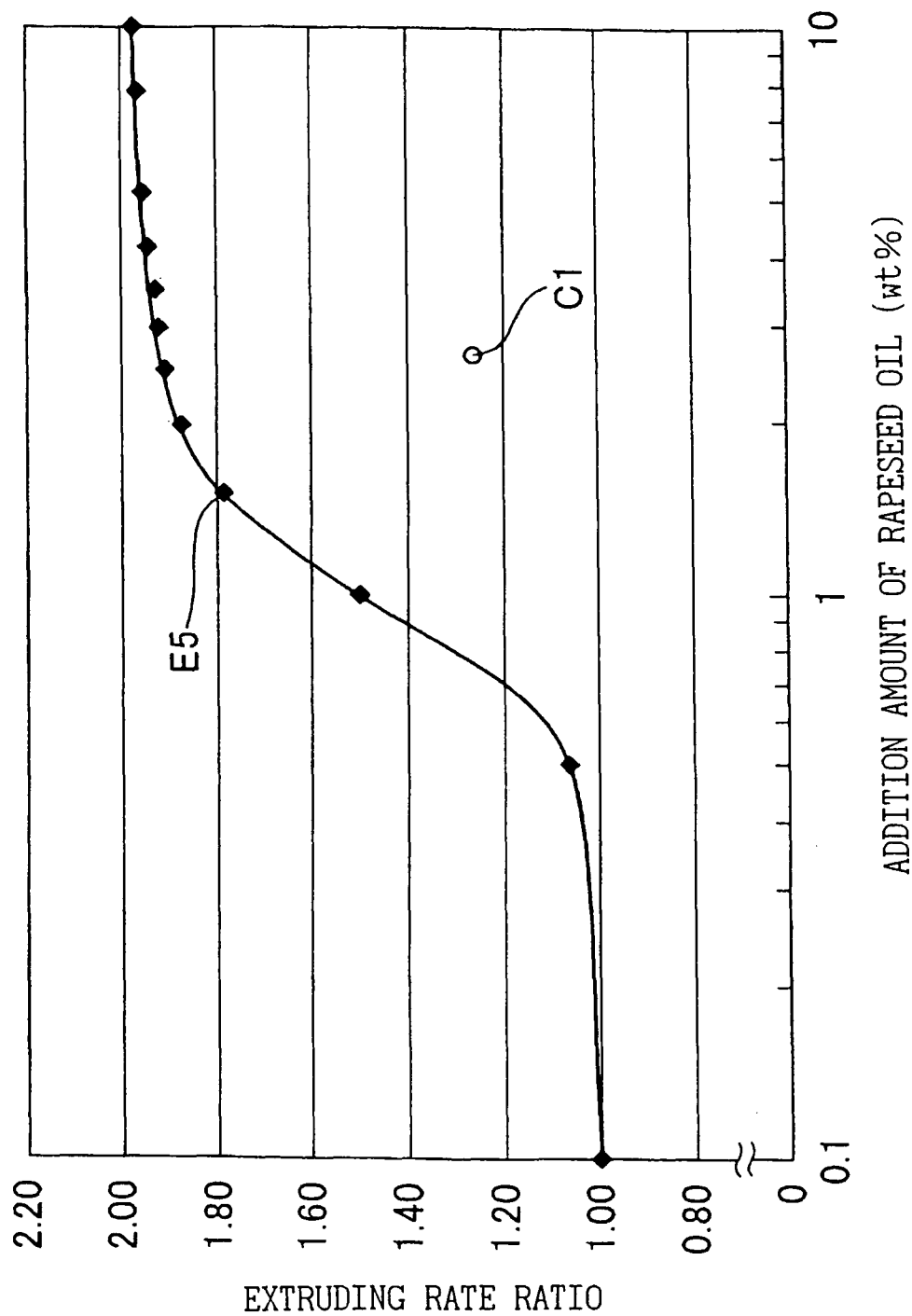
FIG. 6 is an explanatory view showing a relation between an addition amount of rapeseed oil and a extrusion rate ratio in Example 3.

FIG. 6 shows the result. In this diagram, the abscissa represents the addition amount (wt % to be added) of rapeseed oil, and the ordinate does the extrusion rate ratio. The result is represented as E5.

In the diagram, the extrusion rate ratio when 2.7 wt % (to be added) of PPBE as a conventional water-soluble lubricant was added was also plotted as C1. It could be understood by comparing them that when the addition amount of rapeseed oil was at least 1.0 wt % (to be added), a extrusion rate coefficient higher than that of the prior art could be sufficiently obtained.

It was thus clarified that when the addition amount of rapeseed oil was at least 0.5 wt % (to be added), the effect of improving the extrusion rate coefficient could be obtained and when it was at least 1.0 wt % (to be added), the extrusion rate coefficient higher than that of the prior art could be obtained.

On the other hand, when the addition amount of rapeseed oil was increased, the ceramic batch material became so soft, as a whole, that shape retainability of the extrudate became lower. In this example, when the addition amount of rapeseed oil exceeded 10.0 wt % (to be added), shape retainability dropped and a desired honeycomb shape could not be obtained.

Therefore, it could be concluded that the addition amount of rapeseed oil as the lubricant consisting of acyl glycerin as the main component was preferably less than 10.0 wt % (to be added).

From the aspect of the cost, the addition amount of rapeseed oil was preferably small. To obtain reliable improvement of the extrusion rate coefficient and to reduce the cost, therefore, the addition amount was preferably not greater than 8.0 wt % (to be added).

Since the hardness of the ceramic batch material could be regulated by the addition amount of water, a ceramic batch material having suitable hardness could be obtained by adjusting the addition amount of rapeseed oil and the addition amount of water.

Though this example represented the case where rapeseed oil was used as the lubricant, substantially similar effects could be obtained when other lubricants consisting of triacyl glycerin as the main component were used.

It was of course possible to add the conventional water-soluble lubricant to the lubricant consisting of acyl glycerin as the main component. The water-soluble lubricant hardly exhibited the effect of improving the extrusion rate coefficient in this case, but provided a lubrication effect with respect to other equipment such as a water pump.

EXAMPLE 4

In this example, an extremely thin honeycomb structure having a partition thickness of 3 mil (76.2 μm) was actually extruded, and the effect of the lubricant consisting of acyl glycerin as the main component was confirmed.

In other words, the die used for extrusion in this example had a slit width of 3 mil (76.2 μm) and the number of cells of 400 cells/in.$^2$, and a honeycomb structure having an outer diameter of Φ107 mm was molded.

The composition of the ceramic batch material was fundamentally the same as that of Example 3, and the addition amount of rapeseed oil as the lubricant was fixed at 3 wt % (to be added).

For comparison, a test was also carried out by the use of a ceramic batch material containing 3 wt % (to be added) of PPBE as the water-soluble lubricant.

A large-scale screw type vacuum extruder for a production plant (not shown) was used as a kneader and a extruding machine.

Figure 7:
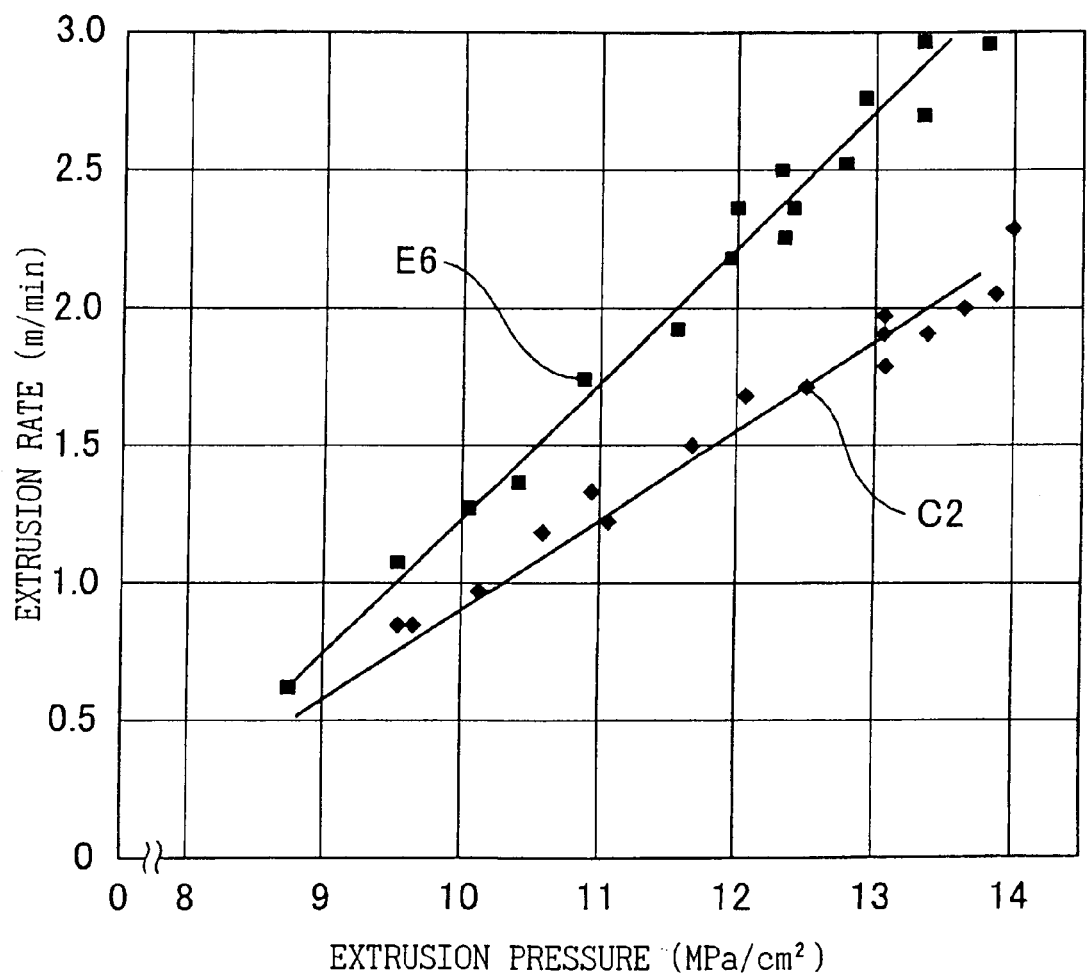
FIG. 7 is an explanatory view showing a relation between a extrusion pressure and a extrusion rate in Example 4.

FIG. 7 shows the test result. In the diagram, the abscissa represents the extrusion pressure (MPa/cm$^2$) and the ordinate represents the extrusion rate (m/min). Symbol E6 represents the case of the addition of rapeseed oil and C2 does the case where PPBE was added.

It can be understood from the diagram that when rapeseed oil as the lubricant consisting of acyl glycerin as the main component was used, the extrusion rate, that is, the extrusion rate coefficient, could be drastically improved at the same extrusion pressure in comparison with the prior art when the honeycomb structure having extremely thin partitions of 76.2 μm was extruded.

EXAMPLE 5

This example used linseed oil as the lubricant consisting of acyl glycerin as the main component, and actually extruded a honeycomb structure having a partition thickness of 4 mils (101.6 μm), the number of cells of 600 cells/in.$^2$ and an outer shape of Φ120 mm. The result was compared with the case where the water-soluble lubricant (PPBE) was used in the same way as in Example 4.

The addition amount of linseed oil was 3 wt % (to be added). The rest were the same as in Example 4.

In this example, extrusion was carried out while the number of revolutions of a motor for turning a screw shaft of a screw type extruder and a motor current were respectively measured to examine the relations between these values and the extrusion rate.

Figure 8:
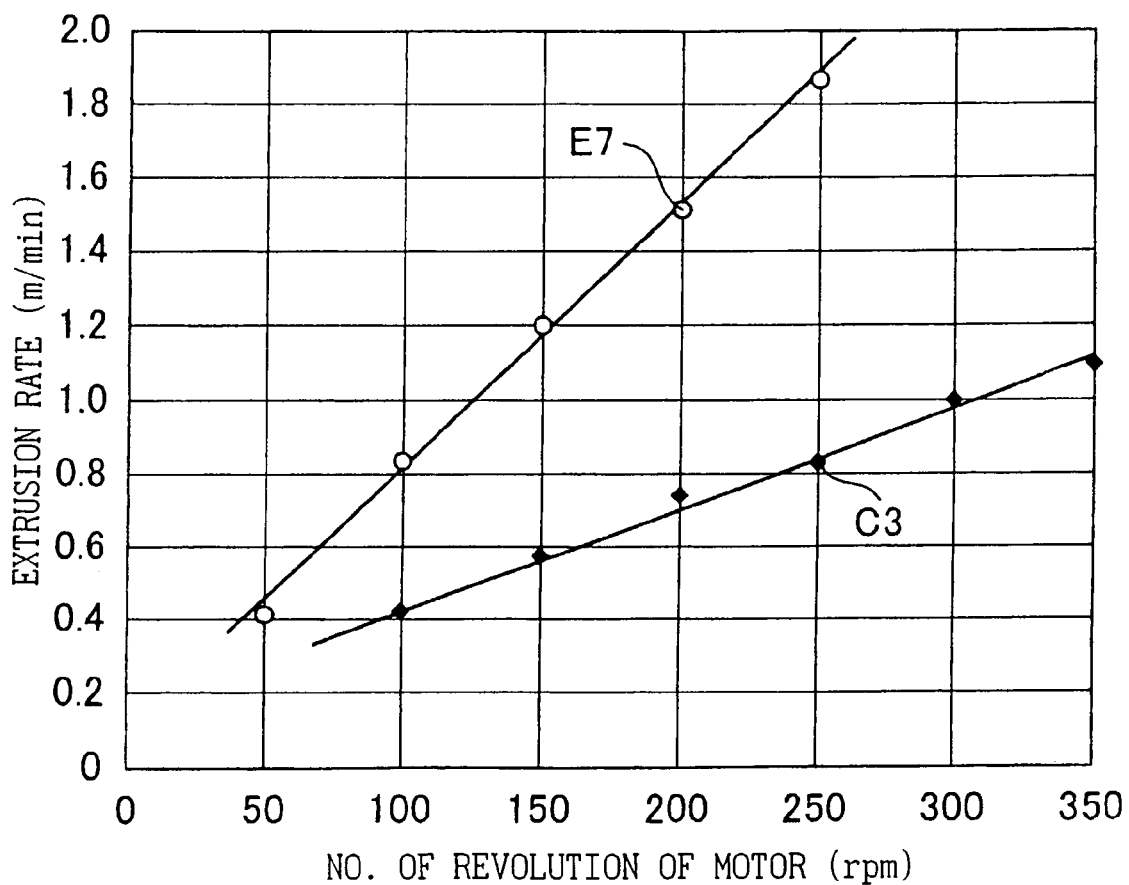
FIG. 8 is an explanatory view showing a relation between the number of revolutions of a motor and a extrusion rate in Example 5.
Figure 9:
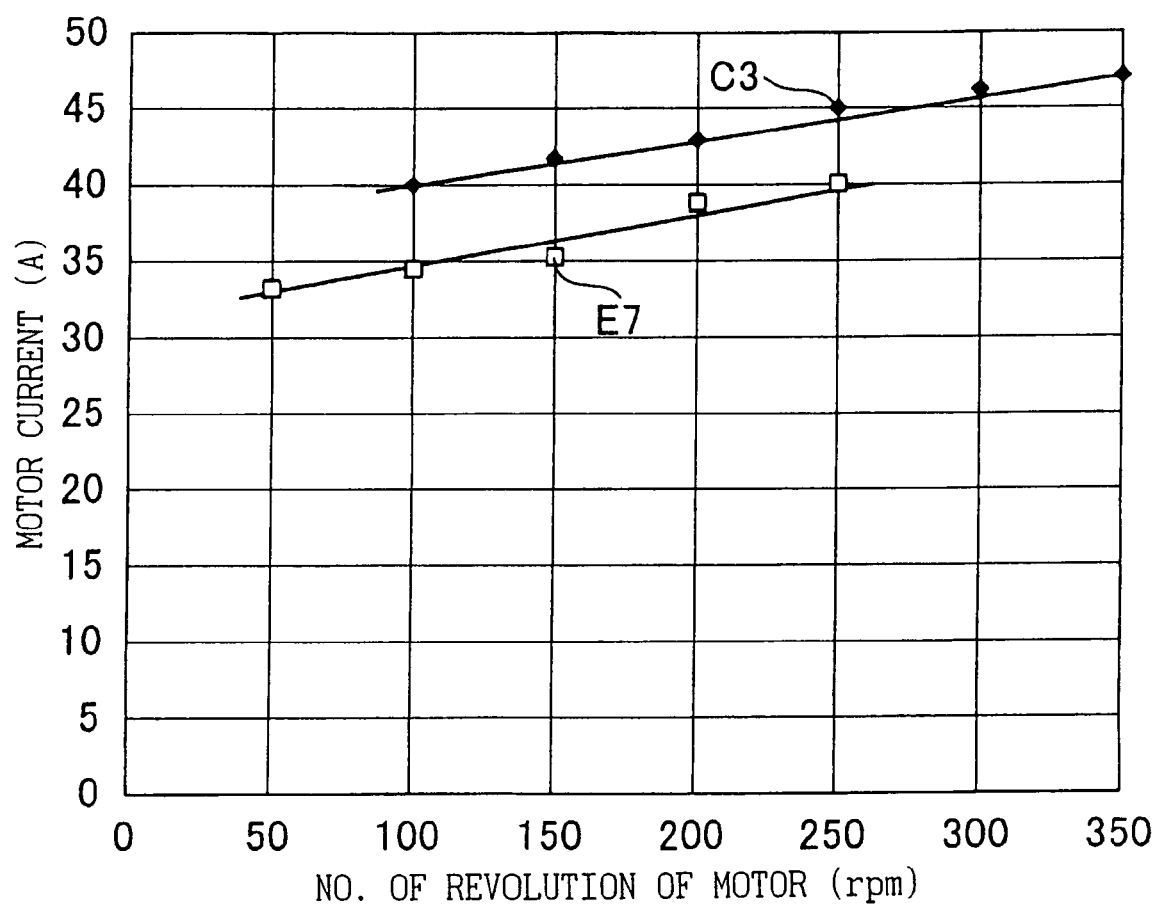
FIG. 9 is an explanatory view showing a relation between the number of revolutions of a motor and a motor current in Example 5.

FIGS. 8 and 9 show the test result. In FIG. 8, the abscissa represents the number of revolutions of the motor (rpm) and the ordinate represents the extrusion rate (m/min). In FIG. 9, the abscissa represents the number of revolutions of the motor (rpm) and the ordinate represents the motor current (A). Symbol E7 represents the case where linseed oil was used and C3 represents the case where PPBE was used.

It can be understood from FIG. 8 that when the number of revolutions of the extrusion screw was the same, the extrusion rate of the case (E6) where linseed oil was used became substantially twice at the same number of revolutions in comparison with the extrusion rate of the case (C3) where the water-soluble lubricant was used.

It could be understood from FIG. 9 that the motor current value at the same number of revolutions became lower in the case (E7) where linseed oil was used than in the case (C3) where PPBE was used, and the motor load at the same number of revolutions dropped. This was presumably because the friction between the ceramic batch material and the die decreased when linseed oil was used as the lubricant consisting of acyl glycerin as the main component. Further, when the lubricant consisting of acyl glycerin as the main component was used, life of the die could be extended due to the decrease of the friction of the die.

EXAMPLE 6

This example used rapeseed oil, linseed oil and soybean oil as the water-insoluble liquid lubricants consisting of triacyl glycerin as the main component. Each ceramic batch material for a ceramic honeycomb structure containing the lubricant in a blend ratio tabulated in Tables 1 to 3 was kneaded in a batch type kneader. The clay hardness (plasticity) was examined, and the ceramic honeycomb structures were extruded by use of a vacuum extruder in the same way as in Example 3 to evaluate extrudability and the extrusion rate.

Figure 10:
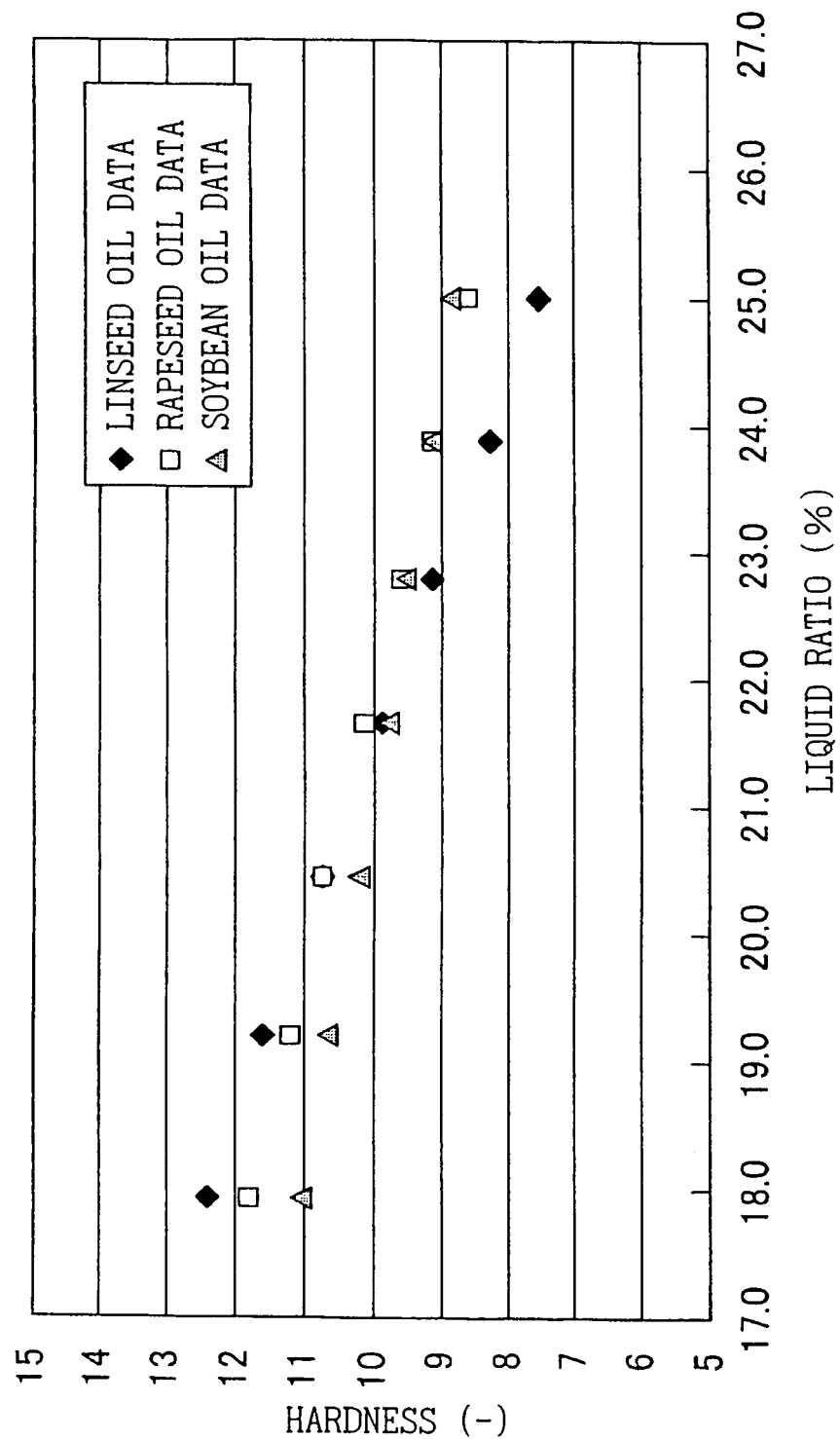
FIG. 10 is an explanatory view showing a relation between a liquid ratio in a ceramic batch material and hardness in Example 6.

Tables 1 to 3 and FIG. 10 illustrate the evaluation results. FIG. 10 shows the clay hardness (plasticity) with respect to the proportion of the total weight of water and the lubricant (hereinafter called "liquid ratio"; unit=wt % (to be added) in the total weight of the material.

Here, clay hardness (plasticity: workability index, stipulated in former JIS P2574 abandoned in 1998) is the value measured by use of a pencil-shaped spring type penetrometer ordinarily used in this field. When a distal end of the penetrometer is inserted into the clay, a higher numerical value represents a higher hardness and a smaller numerical value represents a lower hardness.

It could be understood from FIG. 10 that in all the cases of rapeseed oil, linseed oil and soybean oil, the clay hardness became higher as the sum of the lubricant and water, that is, the liquid ratio, became smaller (plasticity coefficient became greater) irrespective of the ratio of the lubricant and water, and the clay hardness became lower as the liquid ratio became greater (plasticity coefficient became small), and that they had a strong correlation. Therefore, when the lubricant consisting of triacyl glycerin as the main component was added to the raw material of the ceramic honeycomb structure, the clay hardness (plasticity) could be easily regulated by regulating the addition amount of water in accordance with the necessary amount of the lubricant. It was estimated that the extrudability of the ceramic honeycomb structure could be easily regulated.

In this example, a relatively high extrudability could be obtained at a liquid ratio of 18 to 24.5 wt % (to be contained) and a hardness (plasticity coefficient) of 9 to 11 and preferably a liquid ratio of 20 to 22.5 wt % (to be contained) and a hardness of 9.6 to 10.7. Incidentally, the inclination of the relation between the clay hardness (plasticity coefficient) and the liquid ratio became somewhat different depending on the kind of the lubricant presumably because of the difference of the viscosity of the lubricant at the measurement temperature.

For reference, the relation between the temperature of the water-insoluble liquid lubricant used for the test and the kinematic viscosity was examined in this example. Incidentally, the kinematic viscosity (kinematic viscoelasticity) is the quotient obtained by dividing the viscosity (coefficient of viscosity) by the density ($\rho$) of the liquid. Its unit is $mm^2/s$ or cSt, and $1\ mm^2/s = 1$ cSt. Though Pa·s is used in due form as the unit of viscosity (coefficient of viscosity), cP (centi-poise) is customarily, used, and $1\ Pa \cdot s = 1 \times 10^3$ cP.

Figure 11:
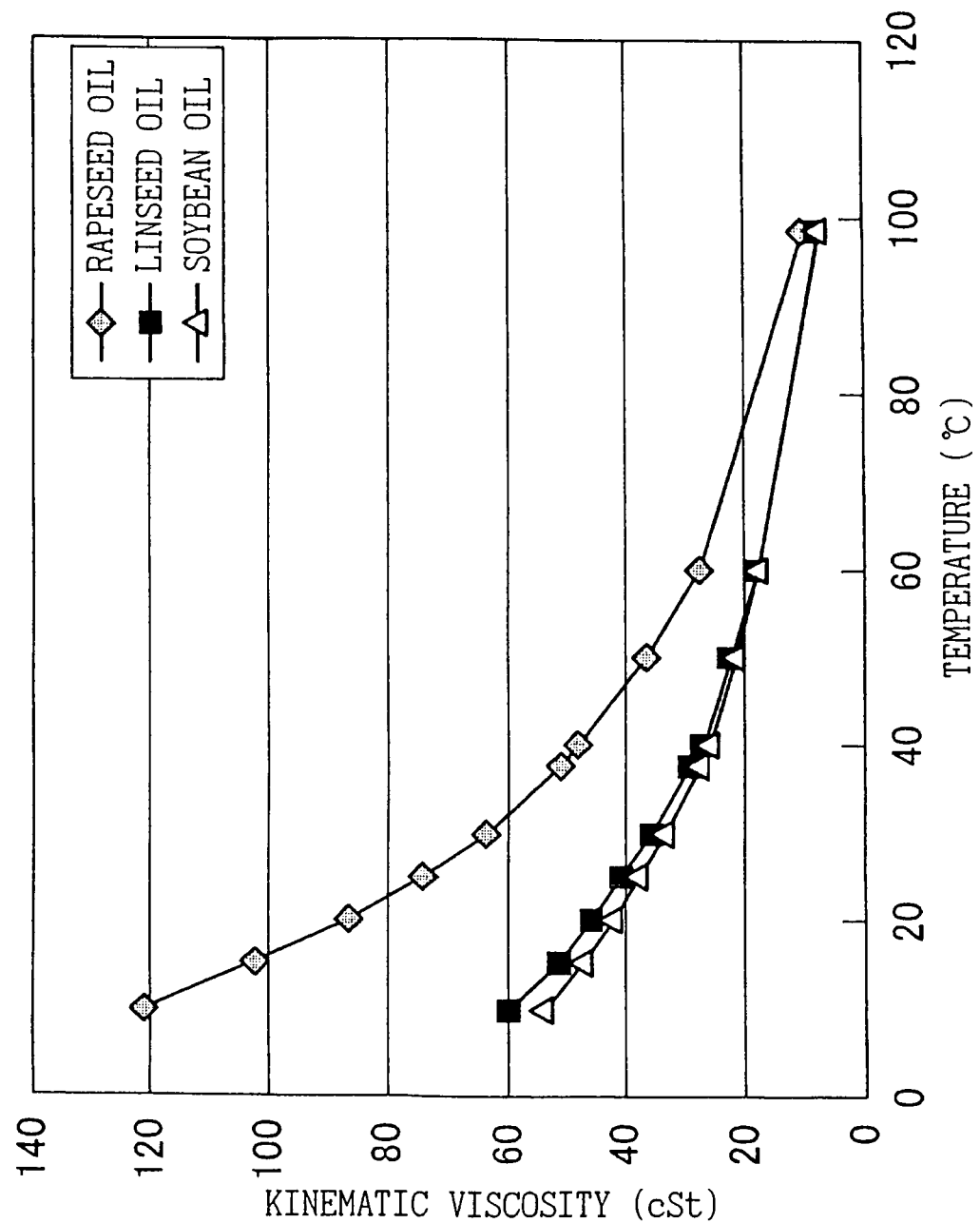
FIG. 11 is an explanatory view showing a relation between a water-insoluble liquid lubricant and a kinematic viscosity (cSt) in Example 6.

In this example, the kinematic viscosity was measured by use of an Ostwald viscometer as a kind of capillary viscometer. FIG. 11 shows the measurement result. In the diagram, the abscissa represents the temperature and the ordinate represents the kinematic viscosity (cSt).

It could be understood from the diagram that the kinematic viscosity at 20° C. was 43.1 cSt for the soybean oil, 86.8 cSt for rapeseed oil and 45.8 cSt for linseed oil. The kinematic viscosity at 40° C. was 27.1 cSt for soybean oil, 47.6 cSt for rapeseed oil and 28.1 cSt for linseed oil.

For reference, the result of measurement obtained by using an E type viscometer and a BH type viscometer (products of Tokyo Keiki Co.) as a kind of rotary viscometer is also shown.

The measurement result by the E type viscometer at 50° C. was 22.0 cp for soybean oil, 24.2 cp for rapeseed oil and 18.2 cp for linseed oil.

The measurement result by the BH type viscometer was available only for linseed oil, and was 100 cp at 10° C., 60 cp at 25° C. and 45 cp at 33° C.

TABLE 1 lubricant: linseed oil

| | ceramic batch material | | | | | | | | | liquid ratio | evaluation result | | |
|---|---|---|---|---|---|---|---|---|---|---|---|---|---|
| | ceramic powder | | methyl cellulose | | lubricant | | water | | | | | | |
| Experiment No. | weight (g) | wt % | weight (g) | wt % (to be added) | weight (g) | wt % (to be added) | weight (g) | wt % (to be added) | wt % (to be contained) | hardness | extrudability | extrusion rate ratio |
| 1 | 3000 | 100 | 150 | 5.0 | 30 | 1.0 | 660 | 22.0 | 18.0 | 12.4 | X | 1.38 |
| 2 | 3000 | 100 | 150 | 5.0 | 90 | 3.0 | 780 | 26.0 | 21.6 | 9.9 | ○ | 1.90 |
| 3 | 3000 | 100 | 150 | 5.0 | 150 | 5.0 | 900 | 30.0 | 25.0 | 7.5 | X | 1.93 |
| 4 | 3000 | 100 | 150 | 5.0 | 30 | 1.0 | 780 | 26.0 | 20.5 | 10.7 | ○ | 1.40 |
| 5 | 3000 | 100 | 150 | 5.0 | 90 | 3.0 | 900 | 30.0 | 23.9 | 8.3 | Δ | 1.85 |
| 6 | 3000 | 100 | 150 | 5.0 | 150 | 5.0 | 660 | 22.0 | 20.5 | 10.7 | ○ | 1.95 |
| 7 | 3000 | 100 | 150 | 5.0 | 30 | 1.0 | 900 | 30.0 | 22.8 | 9.1 | Δ | 1.35 |
| 8 | 3000 | 100 | 150 | 5.0 | 90 | 3.0 | 660 | 22.0 | 19.2 | 11.6 | Δ | 1.92 |
| 9 | 3000 | 100 | 150 | 5.0 | 150 | 5.0 | 780 | 26.0 | 22.8 | 9.1 | Δ | 1.98 |

TABLE 2 lubricant: rapeseed oil

| | ceramic batch material | | | | | | | | | liquid ratio | evaluation result | | |
|---|---|---|---|---|---|---|---|---|---|---|---|---|---|
| | ceramic powder | | methyl cellulose | | lubricant | | water | | | | | | |
| Experiment No. | weight (g) | wt % | weight (g) | wt % (to be added) | weight (g) | wt % (to be added) | weight (g) | wt % (to be added) | wt % (to be contained) | hardness | extrudability | extrusion rate ratio |
| 1 | 3000 | 100 | 150 | 5.0 | 30 | 1.0 | 660 | 22.0 | 18.0 | 11.8 | X | 1.48 |
| 2 | 3000 | 100 | 150 | 5.0 | 90 | 3.0 | 780 | 26.0 | 21.6 | 10.1 | ○ | 1.97 |
| 3 | 3000 | 100 | 150 | 5.0 | 150 | 5.0 | 900 | 30.0 | 25.0 | 8.6 | X | 1.98 |
| 4 | 3000 | 100 | 150 | 5.0 | 30 | 1.0 | 780 | 26.0 | 20.5 | 10.7 | ○ | 1.44 |
| 5 | 3000 | 100 | 150 | 5.0 | 90 | 3.0 | 900 | 30.0 | 23.9 | 9.1 | Δ | 1.95 |
| 6 | 3000 | 100 | 150 | 5.0 | 150 | 5.0 | 660 | 22.0 | 20.5 | 10.7 | ○ | 2.05 |
| 7 | 3000 | 100 | 150 | 5.0 | 30 | 1.0 | 900 | 30.0 | 22.8 | 9.6 | Δ | 1.43 |
| 8 | 3000 | 100 | 150 | 5.0 | 90 | 3.0 | 660 | 22.0 | 19.2 | 11.2 | Δ | 1.92 |
| 9 | 3000 | 100 | 150 | 5.0 | 150 | 5.0 | 780 | 26.0 | 22.8 | 9.6 | Δ | 1.98 |

TABLE 3

| | ceramic batch material | | | | | | | | | | evaluation result | |
|---|---|---|---|---|---|---|---|---|---|---|---|---|
| | lubricant: soybean oil | | | | | | | | | | | |
| | ceramic powder | | methyl cellulose | | lubricant | | water | | liquid ratio | | | extrusion rate ratio |
| Experiment No. | weight (g) | wt % | weight (g) | wt % (to be added) | weight (g) | wt % (to be added) | weight (g) | wt % (to be added) | wt % (to be contained) | hardness | extrudability | |
| 1 | 3000 | 100 | 150 | 5.0 | 30 | 1.0 | 660 | 22.0 | 18.0 | 11.0 | X | 1.38 |
| 2 | 3000 | 100 | 150 | 5.0 | 90 | 3.0 | 780 | 26.0 | 21.6 | 9.8 | ○ | 1.86 |
| 3 | 3000 | 100 | 150 | 5.0 | 150 | 5.0 | 900 | 30.0 | 25.0 | 8.8 | X | 1.90 |
| 4 | 3000 | 100 | 150 | 5.0 | 30 | 1.0 | 780 | 26.0 | 20.5 | 10.2 | ○ | 1.39 |
| 5 | 3000 | 100 | 150 | 5.0 | 90 | 3.0 | 900 | 30.0 | 23.9 | 9.1 | Δ | 1.87 |
| 6 | 3000 | 100 | 150 | 5.0 | 150 | 5.0 | 660 | 22.0 | 20.5 | 10.2 | ○ | 1.95 |
| 7 | 3000 | 100 | 150 | 5.0 | 30 | 1.0 | 900 | 30.0 | 22.8 | 9.5 | Δ | 1.36 |
| 8 | 3000 | 100 | 150 | 5.0 | 90 | 3.0 | 660 | 22.0 | 19.2 | 10.6 | ○ | 1.96 |
| 9 | 3000 | 100 | 150 | 5.0 | 150 | 5.0 | 780 | 26.0 | 22.8 | 9.5 | Δ | 1.92 |

EXAMPLE 7

In this example, the liquid ratio was fixed at 21.35 wt % (to be contained) by adjusting the water content on the basis of the result of Example 6, rapeseed oil was used as the lubricant in the same way as in Example 3, and a extruding test was carried out by changing the addition amount of the lubricant within a range of 1 to 10 wt % (to be added).

When the addition amount of the lubricant was 10 wt % (to be added) in Example 3, shape retainability could not be secured and the resulting extrudate underwent deformation. In this example, the extruding test was carried out at a constant liquid ratio by adjusting the water content. Therefore, extrudability hardly changed even when the addition amount of the lubricant was changed from 1 to 10 wt % (to be added), and an excellent extrusion could be obtained even at 10 wt % (to be added). Moreover, the extrusion rate could be increased when the addition amount of the lubricant was increased in the same way as in Example 3, and its effect could thus be confirmed.

It was found, however, that when the extrudates were sintered, the sintering shrinkage ratio became greater in extrudates having a greater addition amount of the lubricant, and sintering cracks became likely to occur when the addition amount exceeded 8 wt % (to be added).

Therefore, the liquid ratio and extrudability were further examined while the addition amount of the lubricant was kept at 3 wt % (to be added) and 5 wt % (to be added), at which a high extrusion rate could be stably obtained, and the water content was changed.

Figure 12:
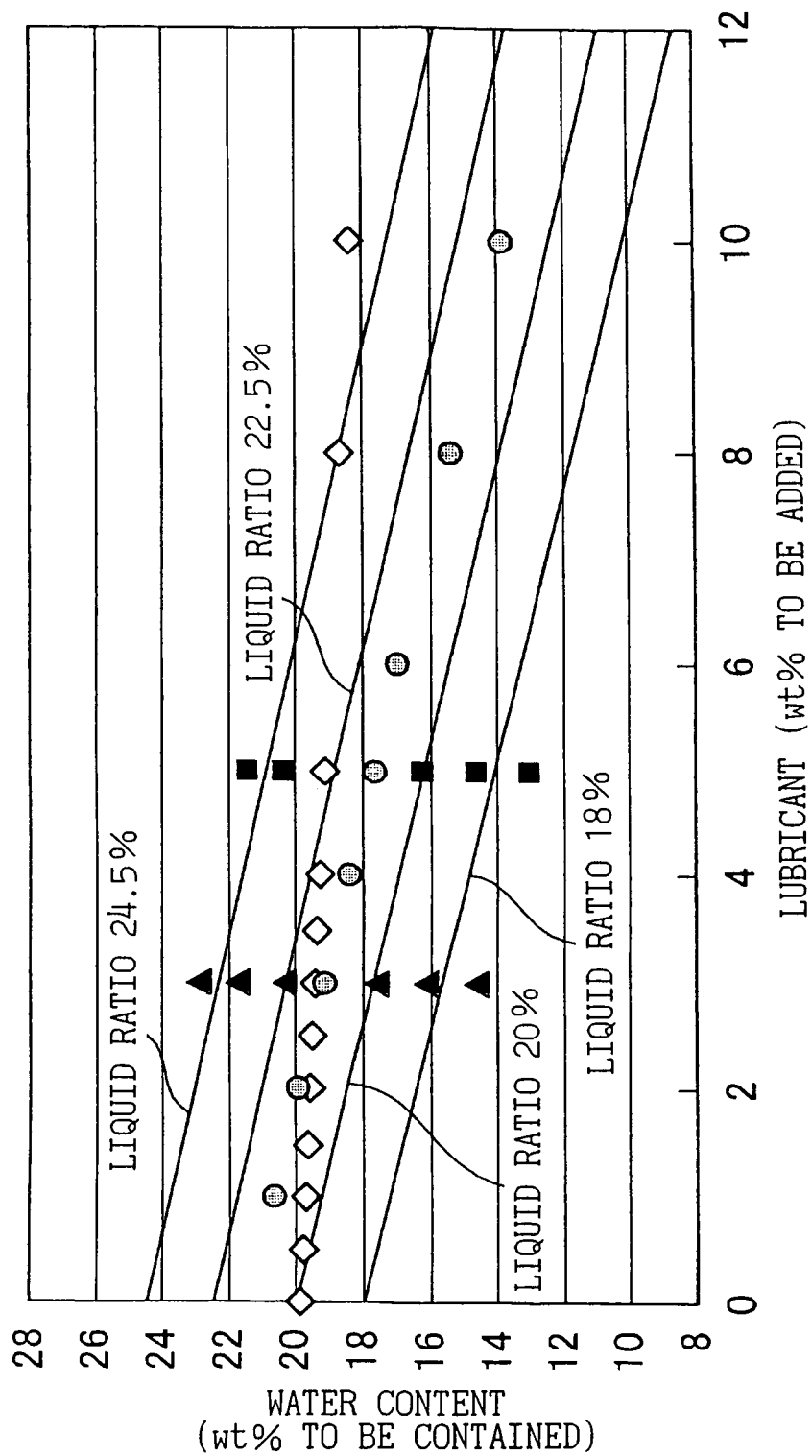
FIG. 12 is an explanatory view showing experimental points of a lubricant content and a water content (moisture ratio) with respect to a matrix in Example 7.

Table 5 and FIG. 12 show the blend proportions (experimental condition) of the test product. Table 4 and FIG. 12 show also the blend proportion (experimental condition) of Example 3, too. In the diagram of FIG. 12, the abscissa represents the addition amount of the water-insoluble liquid lubricant in terms of wt % (to be added) and the ordinate represents the water content (addition amount of water) in terms of wt % (to be contained). A plurality of lines drawn slantingly in the diagram represents the total content (liquid ratio) of water and the water-insoluble liquid lubricant contained in the ceramic batch material in terms of wt % (to be contained). The lines respectively represent from below 18.0 wt % (to be contained), 20 wt % (to be contained), 22.5 wt % (to be contained) and 24.5 wt % (to be contained).

It was found from Tables 4 and 5 that when the liquid ratio was less than 18.0 wt % (to be contained), the clay hardness was so high (the plasticity coefficient was so great) that the extrusion pressure rose and extruding could not be carried out due to the limit of the die strength.

It was also found that when the liquid ratio exceeded 24.5 wt % (to be contained), the clay hardness was so low (the plasticity coefficient became so small) that shape retainability could not be secured and the ceramic honeycomb structure underwent deformation.

Particularly when a ceramic honeycomb structure having thin walls was produced by use of a die having a small slit width, the product strength became small and shape retainability could not be secured easily. In addition, the die resistance increased. Therefore, the range of the liquid ratio in this case was at least 20.0 to 22.5 wt % (to be contained).

Incidentally, though this example represented the case of rapeseed oil as the lubricant, substantially similar results could be obtained when other lubricants consisting of triacyl glycerin as the main component were used.

FIG. 13 shows an optimum range of water and the lubricant for producing a ceramic honeycomb structure by combining the conditions described above with the suitable range of content of the lubricant consisting of triacyl glycerin as the main component. This diagram has the same fundamental construction as that of FIG. 12, and the suitable ranges of the liquid ratio and the water-insoluble liquid lubricant are hatched.

TABLE 4

Condition and result of Example 3

| Experiment No. | wt % (to be added) ratio of material | | | | wt % (to be contained) ratio of material | | liquid ratio | evaluation result | |
|---|---|---|---|---|---|---|---|---|---|
| | ceramic powder | methyl cellulose | water | lubricant | water | lubricant | | extrudability | extrusion rate ratio |
| 1 | 100 | 5.0 | 26.0 | 0.0 | 19.85 | 0.00 | 19.85 | X | 1.00 |
| 2 | 100 | 5.0 | 26.0 | 0.5 | 19.77 | 0.38 | 20.15 | ○ | 1.07 |
| 3 | 100 | 5.0 | 26.0 | 1.0 | 19.70 | 0.76 | 20.45 | ○ | 1.54 |
| 4 | 100 | 5.0 | 26.0 | 1.5 | 19.62 | 1.13 | 20.75 | ○ | 1.79 |
| 5 | 100 | 5.0 | 26.0 | 2.0 | 19.55 | 1.50 | 21.05 | ○ | 1.88 |
| 6 | 100 | 5.0 | 26.0 | 2.5 | 19.48 | 1.87 | 21.35 | ○ | 1.91 |
| 7 | 100 | 5.0 | 26.0 | 3.0 | 19.40 | 2.24 | 21.64 | ○ | 1.93 |
| 8 | 100 | 5.0 | 26.0 | 3.5 | 19.33 | 2.60 | 21.93 | ○ | 1.94 |
| 9 | 100 | 5.0 | 26.0 | 4.0 | 19.26 | 2.96 | 22.22 | ○ | 1.95 |
| 10 | 100 | 5.0 | 26.0 | 5.0 | 19.12 | 3.68 | 22.79 | Δ | 1.96 |
| 11 | 100 | 5.0 | 26.0 | 8.0 | 18.71 | 5.76 | 24.46 | Δ | 1.97 |
| 12 | 100 | 5.0 | 26.0 | 10.0 | 18.44 | 7.09 | 25.53 | X | 1.97 |

TABLE 5

Condition and result of Example 7

| Experiment No. | wt % (to be added) ratio of material | | | | wt % (to be contained) ratio of material | | liquid ratio | evaluation result | |
|---|---|---|---|---|---|---|---|---|---|
| | ceramic powder | methyl cellulose | water | lubricant | water | lubricant | | extrudability | extrusion rate ratio |
| 1 | 100 | 5.0 | 27.5 | 1.0 | 20.60 | 0.75 | 21.35 | ○ | 1.53 |
| 2 | 100 | 5.0 | 26.5 | 2.0 | 19.85 | 1.50 | 21.35 | ○ | 1.89 |
| 3 | 100 | 5.0 | 25.5 | 3.0 | 19.10 | 2.25 | 21.35 | ○ | 1.95 |
| 4 | 100 | 5.0 | 24.5 | 4.0 | 18.35 | 3.00 | 21.35 | ○ | 1.98 |
| 5 | 100 | 5.0 | 23.5 | 5.0 | 17.60 | 3.75 | 21.35 | ○ | 1.99 |
| 6 | 100 | 5.0 | 22.5 | 6.0 | 16.86 | 4.49 | 21.35 | ○ | 2.00 |
| 7 | 100 | 5.0 | 20.5 | 8.0 | 15.36 | 5.99 | 21.35 | ○ | 2.01 |
| 8 | 100 | 5.0 | 18.5 | 10.0 | 13.86 | 7.49 | 21.35 | ○ | 1.99 |
| 9 | 100 | 5.0 | 32.0 | 3.0 | 22.86 | 2.14 | 25.00 | X | 1.91 |
| 10 | 100 | 5.0 | 30.2 | 3.0 | 21.86 | 2.17 | 24.00 | Δ | 1.94 |
| 11 | 100 | 5.0 | 27.5 | 3.0 | 20.29 | 2.21 | 22.50 | ○ | 1.95 |
| 12 | 100 | 5.0 | 23.3 | 3.0 | 17.71 | 2.29 | 20.00 | ○ | 1.96 |
| 13 | 100 | 5.0 | 20.8 | 3.0 | 16.17 | 2.33 | 18.50 | Δ | 1.93 |
| 14 | 100 | 5.0 | 18.5 | 3.0 | 14.63 | 2.37 | 17.00 | X | — |
| 15 | 100 | 5.0 | 30.0 | 5.0 | 21.43 | 3.57 | 25.00 | X | 1.95 |
| 16 | 100 | 5.0 | 28.2 | 5.0 | 20.38 | 3.62 | 24.00 | Δ | 1.98 |
| 17 | 100 | 5.0 | 21.3 | 5.0 | 16.19 | 3.81 | 20.00 | ○ | 2.00 |
| 18 | 100 | 5.0 | 18.8 | 5.0 | 14.62 | 3.88 | 18.50 | Δ | 1.99 |
| 19 | 100 | 5.0 | 16.5 | 5.0 | 13.05 | 3.95 | 17.00 | X | — |

What is claimed is:

1. A production method for a ceramic honeycomb structure having partitions arranged in a honeycomb shape, comprising the steps of mixing and kneading a ceramic batch material devoid of water-soluble lubricants, the ceramic batch material including ceramic powder, triacyl glycerin, water, and a binder, extruding the mixture so kneaded, and drying and sintering a extrudate, wherein:

the temperature of the ceramic batch material is controlled to 10 to 30° C. at the time of extrusion, the triacyl glycerin is a water-insoluble liquid lubricant, that is a water-insoluble liquid at a temperature of said extrusion and having a kinematic viscosity at 20° C. of 30 cSt to 120 cSt, which is added to said ceramic batch material in an amount of 1.0 to 8.0 wt % on the basis of 100 wt % of said ceramic powder, and wherein the sum of the contents of said water and said water-insoluble liquid lubricant contained in said ceramic batch material is 18.0 to 24.5 wt % (to be contained) on the basis of 100 wt % of said ceramic batch material.

2. A production method for a ceramic honeycomb structure according to claim 1, wherein said binder is methyl cellulose, and the content of said binder is 2.0 to 8.0 wt % (to be added) on the basis of 100 wt % of said ceramic powder.

3. A production method for a ceramic honeycomb structure according to claim 1, wherein the thickness of said partition is not greater than 150 μm.

4. A production method for a ceramic honeycomb structure according to claim 1, wherein said ceramic honeycomb structure is produced by extrusion by use of a die having slits for forming said partitions, and a width of said slits is not greater than 150 μm.

5. A production method for a ceramic honeycomb structure according to claim 1, wherein the main component of the aliphatic acid constituting said triacyl glycerin is an aliphatic acid having 18 carbon atoms.

6. A production method for a ceramic honeycomb structure according to claim 1, wherein a saponification value of said triacyl glycerin is not greater than 200.

7. A production method for a ceramic honeycomb structure having partitions arranged in a honeycomb shape, comprising the steps of mixing and kneading a ceramic batch material devoid of water-soluble lubricants and consisting of ceramic powder, triacyl glycerin, water, and a binder, extruding the mixture so kneaded, and drying and sintering a extrudate, wherein:
  the temperature of the ceramic batch material is controlled to 10 to 30° C. at the time of extrusion,
  the triacyl glycerin is a water-insoluble liquid lubricant, that is a water-insoluble liquid at a temperature of said extrusion and having a kinematic viscosity at 20° C. of 30 cSt to 120 cSt, which is added to said ceramic batch material in an amount of 1.0 to 8.0 wt % on the basis of 100 wt % of said ceramic powder, and
  wherein the sum of the contents of said water and said water-insoluble liquid lubricant contained in said ceramic batch material is 18.0 to 24.5 wt % (to be contained) on the basis of 100 wt % of said ceramic batch material.

8. A production method for a ceramic honeycomb structure according to claim 7, wherein said binder is methyl cellulose, and the content of said binder is 2.0 to 8.0 wt % (to be added) on the basis of 100 wt % of said ceramic powder.

9. A production method for a ceramic honeycomb structure according to claim 7, wherein the thickness of said partition is not greater than 150 μm.

10. A production method for a ceramic honeycomb structure according to claim 7, wherein said ceramic honeycomb structure is produced by extrusion by use of a die having slits for forming said partitions, and a width of said slits is not greater than 150 μm.

11. A production method for a ceramic honeycomb structure according to claim 7, wherein the main component of the aliphatic acid constituting said triacyl glycerin is an aliphatic acid having 18 carbon atoms.

12. A production method for a ceramic honeycomb structure according to claim 7, wherein a saponification value of said triacyl glycerin is not greater than 200.

* * * * *